(12) United States Patent
Mayer et al.

(10) Patent No.: US 6,979,704 B1
(45) Date of Patent: Dec. 27, 2005

(54) OPTICAL POLYMER BLEND WITH BIMODAL PARTICLE SIZES

(75) Inventors: Thomas Mayer, Santa Rosa, CA (US); John D. Corless, Santa Rosa, CA (US); Timothy D. Goodman, Windsor, CA (US)

(73) Assignee: JDS Uniphase Corporation, San Jose, CA (US)

( * ) Notice: Subject to any disclaimer, the term of this patent is extended or adjusted under 35 U.S.C. 154(b) by 409 days.

(21) Appl. No.: 10/283,585

(22) Filed: Oct. 29, 2002

(51) Int. Cl.$^7$ .............................................. C08K 3/10
(52) U.S. Cl. ....................... 523/220; 524/786; 524/492
(58) Field of Search ...................... 523/220; 525/932; 524/492, 493, 494

(56) References Cited

U.S. PATENT DOCUMENTS

| | | | |
|---|---|---|---|
| 3,996,187 A | 12/1976 | Travnicek | 260/37 |
| 4,153,641 A | 5/1979 | Deichert et al. | 260/827 |
| 4,189,546 A | 2/1980 | Deichert et al. | 528/26 |
| 4,208,506 A | 6/1980 | Deichert et al. | 528/32 |
| 4,254,248 A | 3/1981 | Friends et al. | 526/279 |
| 4,276,402 A | 6/1981 | Chromecek et al. | 526/264 |
| 4,277,595 A | 7/1981 | Deichert et al. | 528/26 |
| 4,418,165 A | 11/1983 | Polmanteer et al. | 523/210 |
| 4,740,533 A | 4/1988 | Su et al. | 523/106 |
| 4,983,702 A | 1/1991 | Mueller et al. | 528/28 |
| 5,201,763 A | 4/1993 | Brady et al. | 623/6 |
| 5,217,811 A | 6/1993 | Filas et al. | 428/447 |
| 5,233,007 A | 8/1993 | Yang | 528/32 |
| 5,236,970 A | 8/1993 | Christ et al. | 523/113 |
| 5,264,522 A | 11/1993 | Mize et al. | 524/847 |
| 5,266,352 A | 11/1993 | Filas et al. | 427/163 |
| 5,272,013 A | 12/1993 | Raleigh et al. | 428/447 |
| 5,278,258 A | 1/1994 | Gerace et al. | 525/478 |
| 5,307,438 A | 4/1994 | Bilkadi et al. | 385/141 |
| 5,376,694 A | 12/1994 | Christ et al. | 523/113 |
| 5,391,590 A | 2/1995 | Gerace et al. | 523/107 |
| 5,411,553 A | 5/1995 | Gerace et al. | 623/6 |
| 5,420,213 A | 5/1995 | Yang | 525/478 |
| 5,476,513 A | 12/1995 | Brady et al. | 623/6 |
| 5,494,946 A | 2/1996 | Christ et al. | 523/113 |
| 5,512,609 A | 4/1996 | Yang | 523/107 |
| 5,541,278 A | 7/1996 | Raleigh et al. | 528/29 |
| 5,623,029 A | 4/1997 | Yang | 525/478 |
| 5,661,195 A | 8/1997 | Christ et al. | 523/113 |
| 5,661,210 A | 8/1997 | Burns et al. | 524/493 |
| 5,739,199 A | 4/1998 | Eguchi et al. | 524/493 |
| 5,783,115 A * | 7/1998 | Bilkadi et al. | 252/582 |
| 5,869,549 A | 2/1999 | Christ et al. | 523/212 |
| 5,905,108 A | 5/1999 | Kushibiki et al. | 524/492 |
| 5,948,539 A | 9/1999 | Paulsen et al. | 428/447 |
| 5,952,403 A | 9/1999 | Paulsen et al. | 523/212 |
| 6,040,369 A | 3/2000 | Paulsen et al. | 524/212 |
| 6,054,253 A | 4/2000 | Fardad et al. | 430/321 |
| 2003/0109634 A1 * | 6/2003 | Cayton et al. | 524/786 |
| 2003/0229157 A1 * | 12/2003 | Schneider et al. | 523/200 |
| 2004/0143033 A1 * | 7/2004 | Schwarte et al. | 523/171 |

FOREIGN PATENT DOCUMENTS

| | | | | |
|---|---|---|---|---|
| EP | 0 911 360 A1 | 4/1999 | | C08K 3/40 |
| JP | 11 258476 | 9/1999 | | G02B 7/00 |

OTHER PUBLICATIONS

Bruggeman, D.A.G., *Berechnung verschiedener physikalischer Konstanten von heterogenen Systemen*, Ann. Phys. 24, 636 (1935).

Stubel, L.J. and Sun, G.K., *Cement Viscosity as a Function of Concentration in Flow Microstructure of Dense Suspensions*, Ed., Materials Research Society, Symosia Proc., Pittsburgh MRS, 289, 172-78 (1993).

Ferraris, C.F., *Measurements of Rhelolgical Properties of High-Performance Concrete: State of the Art Report*, NIST-IR 5869 (1996).

\* cited by examiner

*Primary Examiner*—Katarzyna Wyrozebski
(74) *Attorney, Agent, or Firm*—Allen, Dyer, Doppelt, Milbrath & Gilchrist, P.A.

(57) ABSTRACT

An optical polymer blend includes sub-wavelength particles to modify the refractive index of a polymer to match the refractive index of micro-particles added to adjust the bulk coefficient of thermal expansion of the blend. A relatively large amount of material may be added to the resin to adjust the bulk coefficient of thermal expansion without unduly increasing the viscosity of the blend before setting. In some applications blends are used for molded or extruded optical elements, in other applications, blends are used for optical adhesives with low coefficients of thermal expansion.

21 Claims, 4 Drawing Sheets

OPTICAL POLYMER BLEND WITH BIMODAL PARTICLE SIZES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The present invention relates generally to polymer resin blended with non-polymer particles, and more specifically to optical polymer blends with a low coefficient of thermal expansion.

Some systems that manipulate light require stringent alignment of optical components. Glasses are used in the majority of these applications in part because of the availability of low or negative coefficient of thermal expansion ("CTE") glasses. Manufacturers of glasses for optical applications have developed glasses that have a negative CTE to compensate for the effects of temperature on the performance of optical systems. Polymers have been used to replace glass optical components in less demanding applications. The CTE of polymers are typically ten times higher than that of glasses. The relatively large CTE of polymers has prevented their use as optical components in the more demanding applications.

The use of inorganic fillers to decrease the CTE and moisture absorption of polymers is well known. Several patents teach the use of glass particles as fillers to improve strength and decrease the CTE of adhesive and resin systems. One technique uses particulates of fumed silica as a filler for polysiloxane resins. Silica particles of a size less than 1 micron have been incorporated in polysiloxane resin to minimize a change in refractive index. The refractive index of the resin was kept between 1.410 and 1.460, based on the d-line of sodium at 587.6 nm, and the index of the resin is close to that of the <1 micron silica particles. As a result, the particles scatter very little light and the mixture is transparent. The change in refractive index with temperature of the resin-silica mixture is improved because the relatively low CTE of the silica lowers the change in bulk density of the resin blend with temperature. Adhesives used for bonding telecommunications fibers in connectors have similarly incorporated submicron mineral particles to modify the CTE and match the refractive index of adhesive to the optical system.

Other mixtures add glass beads to thermoplastic resins to decrease the CTE and moisture absorption characteristics of the resins. The refractive index of the glass beads are adjusted to match the refractive index of the thermoplastic resin matrix. However, a difference in refractive index between the thermoplastic resin matrix and glass beads of +/−0.01065 results in a diffusing material with light scattering properties because of the slight mismatch. The glass beads had diameters in the order of 10 mm.

Organic acrylic monomers have been blended with inorganic salts of acrylic acid monomers to adjust the refractive index of coating material used to form optical waveguides. The inorganic portion of the molecule segregate into particles like domains. These domains have localized refractive index different from the bulk.

BRIEF SUMMARY OF THE INVENTION

An optical polymer blend uses two different sizes of particles to achieve reduced light scattering and a lower CTE. Relatively small particles that do not significantly scatter light are added to a polymer resin to adjust the index of refraction of the mixture to more closely match the index of refraction of larger particles added to reduce the CTE of the blend. In one embodiment, a resin blend includes a matrix having a resin with a first refractive index and a plurality of nano-particles having a second refractive index. The matrix has an intermediate refractive index between the first refractive index and the second refractive index. A plurality of micro-particles having a third refractive index is mixed with the matrix to form the blend. The intermediate refractive index is closer to the third refractive index than the first refractive index is to the third refractive index, thus reducing scattering. Alternatively, adjusting the refractive index of the matrix allows the micro-particles to make up a larger fraction of the blend before scattering becomes objectionable, thus providing a lower CTE at a given limit of scattering than would be obtained without adjusting the refractive index of the matrix.

DETAILED DESCRIPTION OF THE INVENTION

Resin blends suitable for a range of applications, including optical adhesives and optical polymers for molding or machining, include large and small particles to achieve a low CTE and low scattering while maintaining low viscosity of the resin blend in the fluid state. Relatively large particles are embedded in a matrix of resin and relatively small particles. The smaller particles are sub-wavelength particles added to the resin to adjust the refractive index of the matrix to more closely match the refractive index of the largee particles. This allows a greater selection of materials for the larger particles to obtain a low CTE for the resin blend, including materials with a low or negative CTE. The larger particles do not increase the viscosity of the resin blend in the fluid state as much as a similar volume of smaller particles would.

I. An Exemplary Resin Blend with Bimodal Particle Sizes

Figure 1:
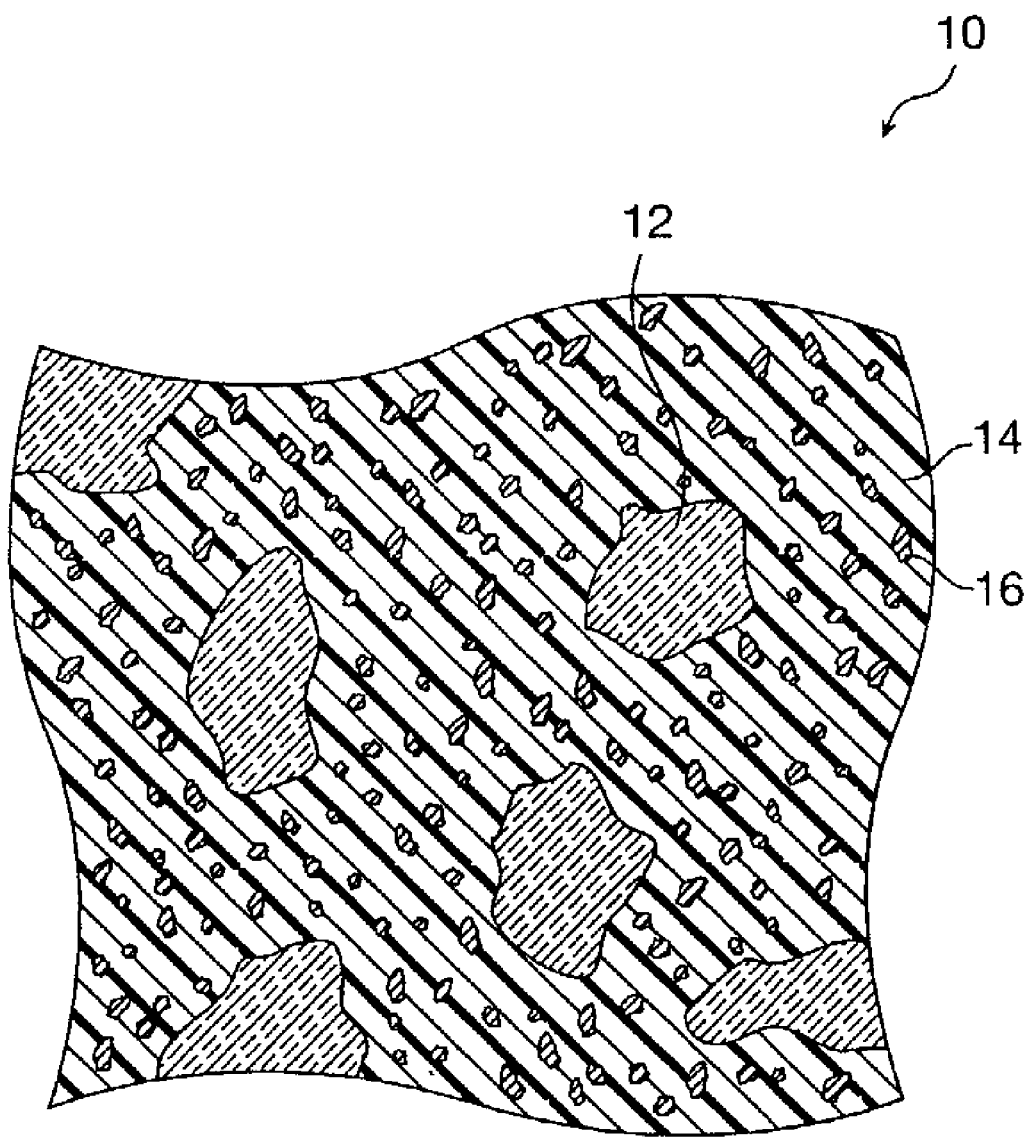
FIG. 1 is a simplified cross section of a portion of a resin blended with particles of different sizes according to an embodiment of the present invention.

FIG. 1A is a simplified cross section of a resin blend 10 according to an embodiment of the present invention. The resin blend includes large particles 12 embedded in a matrix of resin 14 and small particles 16. Thus, "matrix" refers to the resin combined with the small particles.

In a typical optical application, the resin blend will be used at a selected wavelength or within a selected wavelength band. For convenience of discussion, the small particles 16 will be referred to as "sub-wavelength" particles and generally are smaller than one-tenth the shortest wavelength of interest. Such particles are also commonly referred to as "nano-particles" because their size is on the order of nanometers.

The nano-particles are generally not more than 10% of the wavelength of interest for the intended application of the resin blend. Resin blends for use in the ultra-violet ("UV") might have smaller particles, while use in the infra-red ("IR") portion of the spectrum could have larger particles to adjust the refractive index ("RI") of the matrix without significantly increasing scattering. If the resin blend is intended for various applications and a wide range of possible wavelengths, the particles can be chosen to be sub-wavelength of the shortest wavelength of interest.

For example, in an optical resin blend or adhesive intended for use in fiber optic applications at a nominal wavelength of 1550 nm, the nano-particles might typically be less than 155 nm. If the device will function at 1550 nm and 1300 nm, then the particles should generally be smaller than 130 nm across their diameter. If the particle is not spherical, the particles' light scattering characteristics can be used to describe (model) the particle as if it were a sphere.

II. Particle Size and Light Scattering

The nano-particles 16 are added to the resin 14 to adjust the refractive index of the matrix. Keeping the particle size sub-wavelength allows a sufficient volume fraction of small particles to adjust the refractive index over a range sufficient to match the refractive index of the larger "micro-particles" 12, which are typically on the order of microns, but could be larger in some applications. The micro-particles are generally made of a material selected to provide a low CTE for the resin blend. In theory, one might try to add a sufficient volume fraction of nano-particles of a material selected to provide a low CTE; however, adding a volume fraction of such small particles typically increases the viscosity of the mixture to an undesirable level.

Light is scattered by particles if the refractive index of the particles is different from the bulk medium in which the particles are disbursed and the particles are of sufficient size to interact with the light waves. The extent to which light is scattered is dependent upon the size of the particles, wavelength of light, shape of the particles, and difference in refractive index between the particles and bulk medium. Formulas based upon the Mei theory can be used to calculate the relative amount of scatter created by a medium containing dispersed particles smaller than the wavelength of light of interest.

Figure 2A:
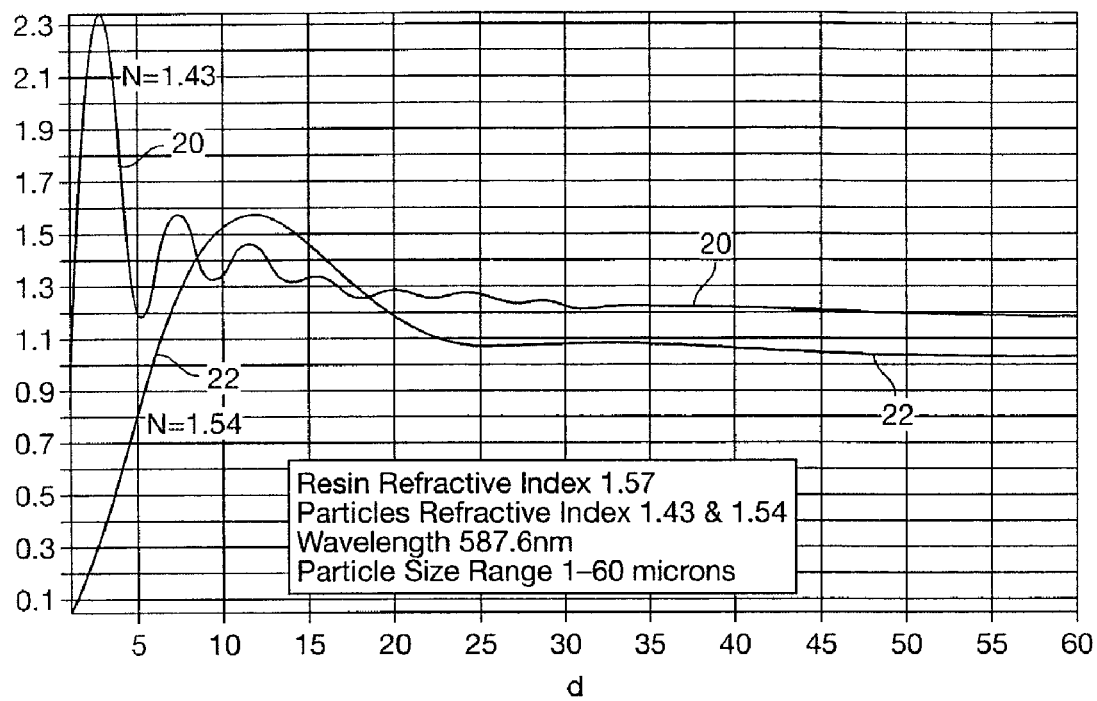
FIG. 2A is a simplified graph of the predicted scattering versus particle size for particles having selected refractive indices.

FIG. 2A is a simplified graph illustrating the predicted scatter efficiency (Y axis) versus particle diameter in microns (X axis). The RI of the resin was chosen as 1.57 and the predicted results are for a wavelength of 587.6 nm. These values were chosen merely for purposes of illustration. The first curve 20 shows the expected scattering efficiency for particles between 1–60 microns that have an RI of 1.43, thus a difference in RI between the resin and the particles of 0.14. The model assumes spherical particles; however, the light-scattering properties of non-spherical particles can be measured and correlated to an equivalent spherical particle size for use in the model. The second curve 22 shows the expected scattering efficiency for particles between 1–60 microns that have an RI of 1.54, thus a difference in RI between the resin and particles of 0.03. FIG. 2A illustrates that the particles with an RI closer to the RI of the resin are less efficient at scattering the light at all but a narrow range of particle sizes (about 8–19 microns).

Figure 2B:
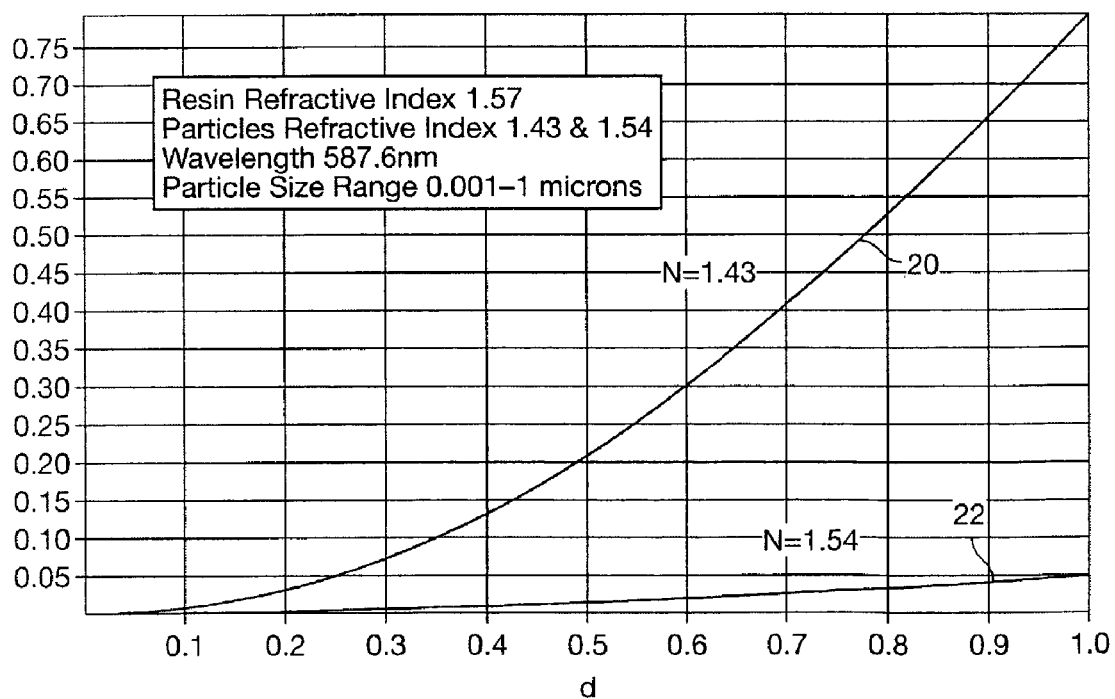
FIG. 2B is a simplified graph of the predicted scattering for the particles illustrated in FIG. 2A showing greater resolution for the smaller particle sizes.

FIG. 2B is a simplified graph of the systems shown in FIG. 2A for very small particle sizes. The RI of the resin is chosen as 1.57, and the wavelength used for the model is 587.6 nm. This graph shows the scatter efficiency for particles between 0.001 micron to 1 micron. Even particles with a relatively high difference in refractive index show little scatter if the particles are small enough.

Figure 3:
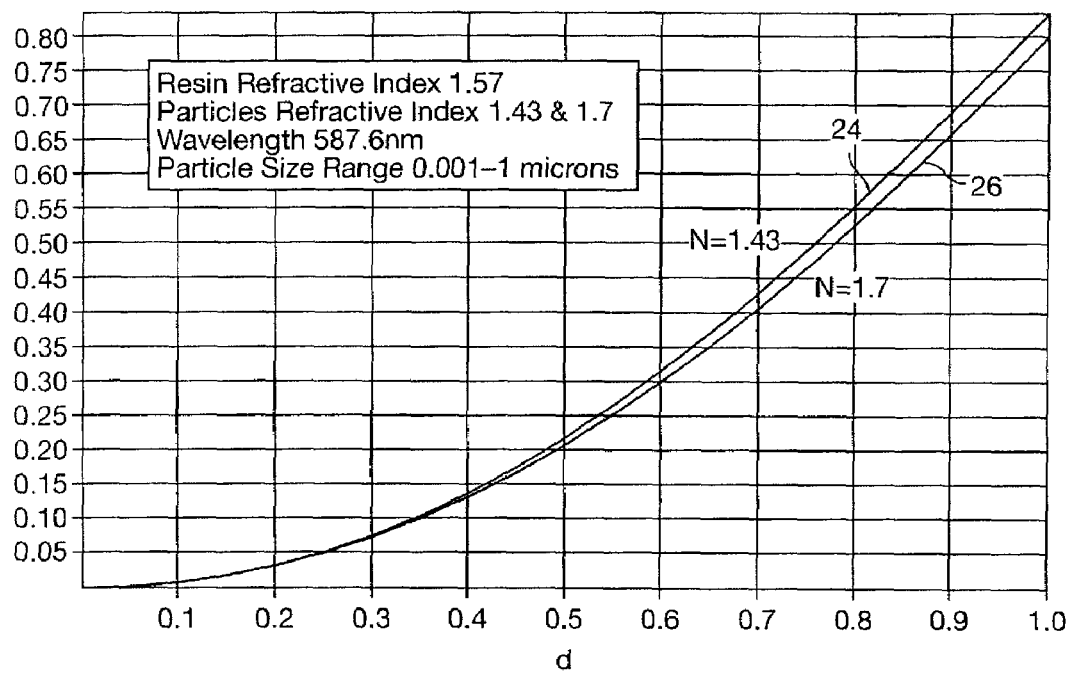
FIG. 3 is a simplified graph of the predicted scattering versus particle size for particles having other selected refractive indices.

FIG. 3 is a simplified graph illustrating scatter efficiency versus particle size for particles with refractive indices on either side of the RI of the resin. Again, the RI of the resin is 1.57 and the wavelength is 587.6 nm. The first line 24 represents particles between 0.001 micron to 1 micron in diameter with an RI of 1.43, thus a difference in RI between the particles and the resin of −0.14. The second line 26 represents particles with an RI of 1.7, thus a difference in RI between the particles and the resin of 0.13. This graph shows that similarly sized particles of material should have similar scattering whether the RI of the particles is greater than or less than the resin (for differences of RI in the range of about 0.1–0.15).

Figure 4:
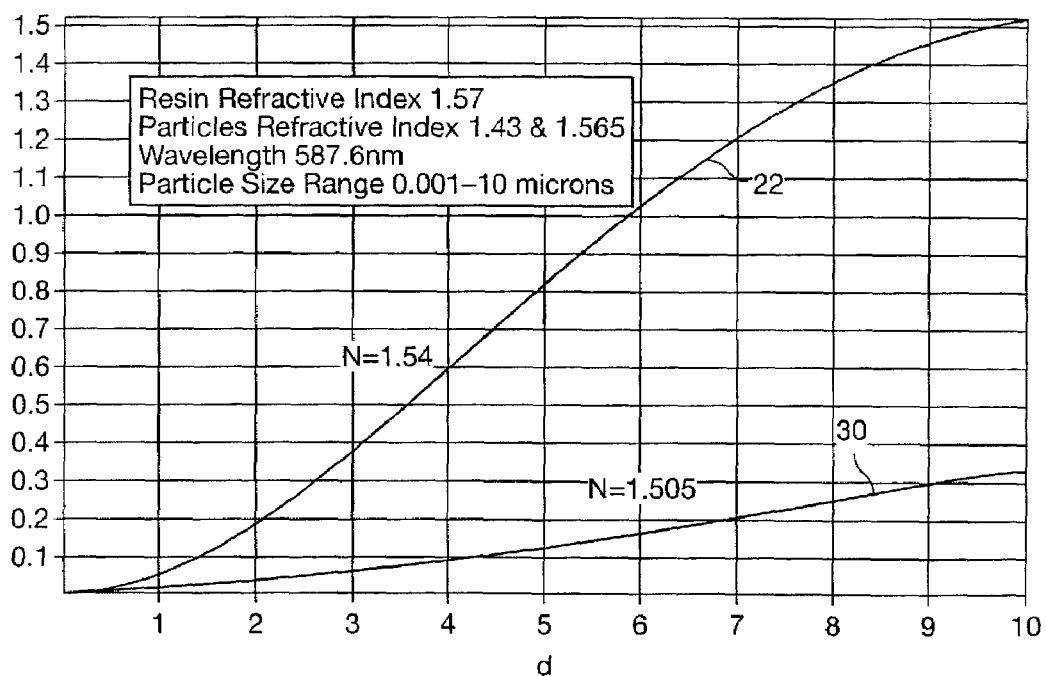
FIG. 4 is a simplified graph of the predicted scattering versus particle size for particles having a refractive index close to the index of the surrounding resin.

FIG. 4 is a simplified graph illustrating scatter efficiency versus particle size for particles with an RI close to the RI of the resin. The RI of the resin is 1.57 and the wavelength is 587.6 nm. The first curve 22 is the same simulation shown in FIGS. 2A and 2B on another scale of particle size. The second curve 30 shows the scattering efficiency for particles between 0.001 micron to 10 microns that have an RI of 1.565. The difference between the RI of the resin and the RI of the particles illustrated by the second curve 30 is only 0.005. Thus, it appears relatively large particles may be mixed with polymer resins if the RIs of the materials are sufficiently close.

The microgeometry of the sub-wavelength particles plays an important role for the effective dielectric function. If, for example, the embedded particles are metallic and the host material is an insulator the effective medium can show metallic or insulating behavior, depending on whether there is a percolating network of the embedded particles or not. As used here, a "percolating network" means the particles dispersed in the matrix touch each other, so that a percolating network of metallic particles in an insulating matrix provides a conductive path from essentially each metal particle to another. However, other properties of the topology may significantly influence the effective dielectric function.

The optical properties of inhomogeneous materials can be described by so-called effective dielectric functions if the wavelength of the probing radiation is much larger than the typical sizes of the inhomogeneities of the system. In this case retardation effects can be neglected and the response of the mixed material to an incoming electromagnetic wave can be calculated in a quasi-static approximation, ie. one has to answer the question: which volume averaged polarization will exist in the sample in response to an applied static electric field?

Macroscopically, the inhomogeneities cannot be seen (there is no light scattering in the long wavelength limit) and the system can then be treated as being quasi-homogeneous. An effective dielectric function $\epsilon_{eff}$ can be introduced which is an non-trivial average of the dielectric functions of the individual components.

Several simplified 'mixing formulas' have been established, the most prominent being the ones of Maxwell-Garnett and Bruggeman. A model attributed to Looyenga for some typical microstructures also can yield good results. All these simple effective medium concepts use just one parameter to characterize the microgeometry, namely the volume fraction $f$ of the embedded particles. Unfortunately, in many cases this oversimplification results in quite wrong results.

The Maxwell-Garnett formula is the following:

$$\frac{\varepsilon_{eff} - \varepsilon_M}{\varepsilon_{eff} + 2\varepsilon_M} = f \frac{\varepsilon - \varepsilon_M}{\varepsilon + 2\varepsilon_M}$$

which is applicable to systems of low volume fractions of the embedded particles, which must also be far away from each other.

The Looyenga formula is:

$$\varepsilon_{eff}^{\frac{1}{3}} = f\varepsilon^{\frac{1}{3}} + (1-f)\varepsilon_M^{\frac{1}{3}}$$

which is included because it has some features being useful for certain cases. However, for any volume fraction the expression implies a percolation. This means one can try to use it for very loosely packed systems, which have nevertheless a connected network of the particles, e.g. metal blacks.

The most general concept, due to Bruggeman, holds in any case (as long as the electrostatic approximation is valid) and is therefore included in this discussion. All effective dielectric function objects need to point to two dielectric functions, namely those of the host material and of the embedded particles. The Bruggeman theory (also known as effective medium approximation, or "EMA") gives the relation:

$$(1-f)\frac{\varepsilon_M - \varepsilon_{eff}}{\varepsilon_M + 2\varepsilon_{eff}} + f\frac{\varepsilon - \varepsilon_{eff}}{\varepsilon + 2\varepsilon_{eff}} = 0$$

and is probably the most often used effective medium concept. For very low volume fractions it is equivalent to the Maxwell-Garnett theory, but for increasing volume fraction its results are quite different. Below $f=\frac{1}{3}$ there is no percolation, above that threshold the embedded particles are assumed to be partially connected.

III. Particle Size and Viscosity

Figure 5:
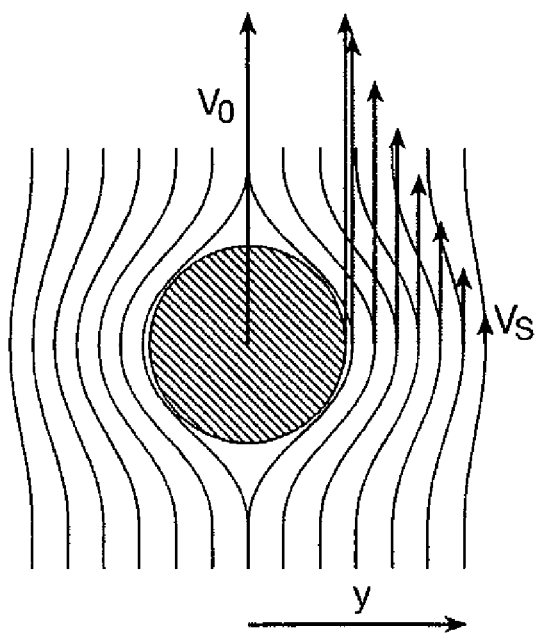
FIG. 5 is a simplified diagram illustrating viscous flow of resin around a particle.

Unfortunately, adding very small particles to a liquid tends to increase the viscosity of the liquid. In the Stokes model for motion of a hard sphere through a viscous liquid, the resistance to motion is related to the shearing force between adjacent solvent planes moving at different velocities, as illustrated in FIG. 5 and described by the following equation:

$$\frac{Fs}{A} = \frac{m}{A} \times \frac{dv}{dt} = \eta \frac{dv}{dy}$$

The shearing force per unit area ($F_S/A$) at each slippage plane is described with the following differential equation, where m is the mass, A is the surface area, dv/dt is the acceleration, $\eta$ is the viscosity of the medium, and dv/dy is the velocity gradient across the shearing planes.

For stick boundary conditions, where the limiting assumption is made that the fluid layer adjacent to the particle has the same velocity as the particle, solution of the above equation gives the total force of viscous resistance ($F_{vis}$) as shown below, where R is the particle radius and $v_S$ is the limiting steady state velocity of the fluid when y becomes very large:

$$F_{vis} = 6\pi\eta R(v_S)$$

The proportionality factor in the above expression is defined as the frictional ($f=6\pi\eta R$), and the frictional coefficient is related to the particle diameter (D) as shown below:

$$D = \frac{kT}{f} = \frac{kT}{6\pi\eta R} \Rightarrow R = \frac{kT}{6\pi\eta D}$$

Another approach in predicting the viscosity of a thermoplastic/particulate blend is to compare the blend to concrete paste. A method to measure cement paste viscosity was developed by Struble. She based her model on the Krieger-Dougherty equation:

$$\frac{\eta}{\eta_0} = \left(1 - \frac{\phi}{\phi_m}\right)^{-[\eta]\phi_m}$$

This equation shows that there is an increase in the viscosity of the medium when particles are added. This increase depends on the concentration of the particles where [$\eta$], the intrinsic viscosity, is equal to 2.5 for spheres, $\Phi$ is the volume concentration of particles, $\Phi_m$ the maximum packing, $\eta$ the viscosity of the suspension, and $\eta$ is the viscosity of the medium. Therefore, if the viscosity of the cement paste and the concentration of the aggregates are known and the maximum packing of the particles is determined, then the viscosity of the concrete can be calculated.

The increase in effective or bulk viscosity of volcanic magma induced by suspended crystals can by estimated using the Einstein-Roscoe equation:

$$\eta = \eta_0(1-RC)^{-2.5}$$

where $\eta$ is the effective viscosity of a magmatic liquid, C is the volume fraction of suspended solids; $\eta_0$ is the viscosity of the magmatic liquid alone; and, R is a constant with a best-estimated value of 1.67. The Einstein-Roscoe equation can also be used to model the viscosity changes induced during extrusion molding of a thermoplastic containing dispersed particulate.

Glass-filled clear plastic is known for fabrication of optical lenses by injection molding. Relatively large (i.e. greater than a wavelength of interest) glass particles are blended into thermoplastic resin using glass particles that have the same index of refraction as the thermoplastic resin. If particles with a slightly different index of refraction are blended with the thermoplastic resin, a light-scattering element can be created. However, the materials that can be used that match the refractive index of a glass with a thermoplastic resin are limited. There are only a few commercially available glasses that will match the index of refraction of the commonly used resins. Furthermore, some glasses that match the index of refraction of a specific polymer may not be chemically stable. For example, metallic ions in the glass could migrate to the surface of the glass causing adhesion failure between the glass and the thermoplastic and/or form a material phase of different index of refraction at the glass-thermoplastic interface. The index difference at the interface of the two materials could result in an undesirable increase in light scattering. The mechanical properties of the glass-thermoplastic would also be expected to degrade with the loss of constituent interfacial adhesion.

IV. Reduction of the CTE of Resin Blends

Glass particles have been added to resins to lower the bulk CTE of the resulting mixture. However, the CTE of the glass is dependent upon its chemical make up and process conditions used to form the glass. Refractive index is wavelength dependent. The refractive index of a thermoplastic and glass typically only match over a limited wavelength range because of the dependence of refractive index on wavelength, which is also true for thermosetting plastics. Therefore, one type of glass combined with one type of resin is generally not suitable for use at all wavelengths. Powdered glasses are not commercially available that can meet the wavelength dependent refractive index matching requirements to yield low scattering resin/particle blends. While bulk optical glass can be commercially obtained with essentially any index with in the range of such glass, glass supplied as particles often has lot-to-lot variation in the index of refraction. There can be so much variation that it becomes desirable to adjust the index of refraction of the surrounding resin.

Another problem arises using sub-wavelength particles to lower the CTE of a resin blend. The greater the percent volume of inorganic particles in an organic resin/particle blend, the greater the difference will be between the CTE and absorption properties of the blend compared to the neat organic resin; however, the viscosity of the blend increases with particulate concentration. The surface area to particle size ratio increases as particle size decreases, and smaller particles increase the interaction between the surfaces of the particles and the polymer chains of the resin. Movement of polymer chains that interact with the particle surfaces is impeded. This results in an increase in the viscosity of a filled polymer system. The amount of filler that can be added to a resin system is functionally limited by the increase in viscosity that can be tolerated.

As particle size increases the surface area to volume ratio of the particle decreases. The larger the particles, the less effect they have on the viscosity of a blend compared to an equivalent weight of smaller particles. There is no expected difference in the CTE of particle/polymer blends that contain the same volume % of particles, of the same material, regardless of the size of the particles. However, there will be a difference in rheological properties of the blends because of the larger surface area of small particles compared to blends with larger particles. As the size of particles approaches or is greater than the wavelength of light of interest, the difference in refractive index between the blend components must be very small to prevent the particles from scattering light.

Smaller particles produce lower scatter than larger particles. Larger particles have less effect on viscosity then smaller particles. A glass with a refractive index that matches one polymer might not match another polymer. The refractive index of available particles and the effect of the small particles on resin viscosity limit the reductions in CTE and absorption properties that can be achieved using conventional resin/particle blends.

The CTE and/or barrier properties of polymer blends for optical applications can be improved with minimal effect on viscosity by adding sub-wavelength particles to adjust the refractive index of a matrix to match the refractive of other, larger particles added to adjust the CTE of the polymer blend. In some cases, the volume % of nano-particles required to match the index of refraction is less than the volume % required to adjust the CTE. The refractive index of the polymer and nano-particle additives can be mismatched to provide less light scattering than would occur with an equivalent volume % of macro-particles without the nano-particles. This allows a broad range of material to be used, including materials with a negative CTE, in relatively large volumes in order to control the CTE of resin blends according to embodiments of the present invention.

An optical element consisting of a polymer containing a bimodal distribution of particles where one particle size probability distribution consists of particles smaller than the shortest wavelength of light that will pass through the optical element, the other particle size probability distribution consists of particles larger than the longest wavelength of light that will pass through the optical element, the concentration of nano-particles in the bulk matrix are at a level as to increase or decrease the refractive index of the undiluted bulk by at least 0.001(wavelength of operation). The other particle size probability distribution consists of particles larger than the longest wavelength of light that will pass through the optical element at a concentration that will increase or decrease the CTE of the bulk matrix by 1E-7. The materials chosen for the particles in the smaller size probability distribution have refractive indices between 1.3 and 2.8, based on the d-line of sodium at 587.6 nm. The concentration of small particles is adjusted such that the bulk matrix has the same refractive index as the particles in the larger size probability distribution. In one embodiment, the amount of nano-particles added brought the refractive index of the bulk matrix to within ±0.001 at the desired wavelength (wavelength of operation). This amount of particles resulted in a CTE of about 1E-7. The particles in the smaller size probability distribution can consist of a mixture of different materials with different refractive indexes. To minimize scattering effects of the CTE-adjusting (larger) particles, it is desirable that the difference in the refractive index between the matrix (resin+sub-wavelength particles) be less than ±0.001, although a greater difference might be tolerable in some applications.

While mixing very small particles into a resin is not trivial because of the possibility of incorporating bubbles in the mixture, thus degrading the optical performance, techniques have been developed for mixing small particles in resin. In particular, mixtures of resin and sub-wavelength silica particles have been advertised for sale. The silica is mixed with the resin to directly lower its CTE, and the volume fraction and particle size of these known mixtures is sufficient to achieve such a result.

V. Examples of Bimodal Particle Size Resin Blends

Many different materials can be used to adjust the bulk RI of the matrix, such as sub-wavelength particles of $TiO_2$, $ZrO_2$, $BaSO_4$, inorganic salts of organic acids, semiconductor or metallic elements that are associated with organic ligand(s), polymers with the appropriate index of refraction. Such materials generally have a greater RI than the resin they are mixed with, and thus increase the bulk RI of the matrix without significant increasing scattering. More than one type of material can be combined to adjust the bulk RI of the matrix. Examples of suitable resins include polycarbonate resin, acrylic resin, epoxy resin, urethane resin, perfluoroether resin, polymethylpentene resin, and nylon resin, and can be thermosetting or thermoplastic. In other embodiments, materials that lower the bulk RI of the matrix, such as $SiO_2$ can be added to the resin, such as a polycarbonate resin.

Adjusting the bulk RI of the matrix allows greater selection in the type of material used to adjust the CTE of the blend. Materials blended with the matrix of resin and nano-particles are generally on the order of microns across, but could range from 2 microns to 4 mm, depending on the desired CTE and acceptable viscosity of the blend. The particles could have a positive CTE lower than that of the polymer, or a negative CTE. In other embodiments, the particles could have a positive CTE higher than that of the polymer. In a further embodiment, the micro-particles are treated to improve adhesion with resin by decreasing shrinkage during cure, which lowers the interfacial stress at the bond interface.

As discussed above, many factors come into play when designing a resin blend according to embodiments of the present invention. The following examples are exemplary only and various substitutions and modifications are possible, depending on the desired result.

In one example, a resin blend suitable for molding ("extrusion blend") includes 10 vol. % of $SiO_2$ having a mean particle size of less than 50 nm mixed with polymethylpentene resin, such as ZEONEX E48R™, manufactured by ZEON CHEMICALS of Tokyo, Japan, to obtain an adjusted RI of about 1.5200 for the resultant matrix material. The matrix material has a CTE of about $180 \times 10^{-6}$. Thirty vol. % of soda lime glass particles having diameters of about 50–100 microns are added to lower the bulk CTE of the resin blend to about $126 \times 10^{-6}$.

In another example, a resin blend suitable for use as an adhesive ("adhesive blend") includes 33.87 vol. % of $SiO_2$ having a mean particle sized of less than 50 nm mixed with an epoxy resin package, such as EPOTEK PRODUCT 302™, manufactured by EPOXY TECHNOLOGY of Billerica, Mass., to obtain an adjusted RI of about 1.5200 for the resultant matrix material. The matrix material has a CTE of about $58 \times 10^{-6}$. Thirty vol. % of soda lime glass particles having 50–100 micron diameters were added, which lowered the bulk CTE of the resin blend to about $27 \times 10^{-6}$. In a particular embodiment, a resin blend using epoxy resin has a coefficient of thermal expansion less than 50 parts-per-million and the resin has a first light transmission, the resin blend has a second light transmission and a difference between the first light transmission and the second light transmission is not greater than 5% of the first light transmission.

VII. Exemplary Methods

Figure 6:
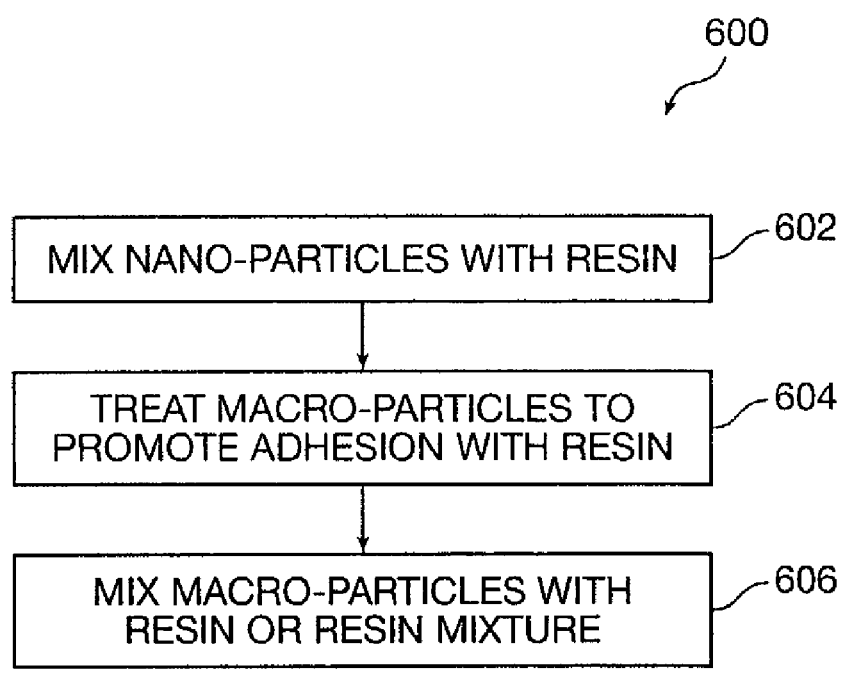
FIG. 6 is a simplified flow chart of a process for making a resin blend according to an embodiment of the present invention.

FIG. 6 is a simplified flow chart of a method 600 for forming a resin blend according to an embodiment of the present invention. The order of the steps is not limiting unless necessarily so. Nano-particles are blended with at least a portion of the resin (step 602) to adjust the RI of the resultant matrix mixture. In the case of a thermoplastic resin, the resin is typically heated to facilitate mixing, while in the case of a thermosetting two-part resin, such as an epoxy resin, the nano-particles and the micro-particles can both be added to one part or the other, or the nano-particles can be added to the first part, while the micro-particles are added to the second part, which is later mixed with the first part to form the resultant blend. Micro-particles are optionally treated to improve adhesion between the resin and the particles (step 604) by treatment with organic siloxanes, such as Z6030™, manufactured by DOW-CORNING CORP., stanious chloride/HCl, or other processes known in the art to improve particle-to-resin surface adhesion; and mixed with the matrix mixture (step 606) to adjust the CTE of the resultant resin blend. Alternatively, the micro-particles may be mixed with the resin before the nano-particles are added.

While the invention has been described above with respect to specific embodiments, various modifications and substitutions may become apparent to one of skill in the art without departing from the present invention. For example, it may be desirable to increase the CTE of a resin blend; to add nano-particles of material for adjusting the CTE, in addition to the micro-particles of that or a different material; to add several different types of nano-particles for adjusting the RI; or several different types of micro-particles for adjusting the CTE. Therefore, the invention should not be limited by the examples of embodiments given above, but by the following claims.

What is claimed is:

1. A resin blend comprising:
    a matrix including
        a resin with a first refractive index, and
        a plurality of nano-particles having a second refractive index, the matrix having an intermediate refractive index between the first refractive index and the second refractive index; and
    a plurality of micro-particles having a third refractive index, the intermediate refractive index being closer to the third refractive index than the first refractive index is to the third refractive index.

2. The resin blend of claim 1 wherein a first absolute difference between the first refractive index and the third refractive index is greater than 0.001 at a selected wavelength, and a second absolute difference between the intermediate refractive index and the third refractive index is less than or equal to 0.001 at the selected wavelength.

3. The resin blend of claim 1 wherein the micro-particles have a negative coefficient of thermal expansion.

4. The resin blend of claim 3 wherein the micro-particles include a chemically modified surface layer.

5. The resin blend of claim 3 wherein the micro-particles comprise glass.

6. The resin blend of claim 1 wherein the micro-particles have a first positive coefficient of thermal expansion and the resin has a second positive coefficient of thermal expansion, the first positive coefficient of thermal expansion being less than the second positive coefficient of thermal expansion.

7. The resin blend of claim 1 wherein the resin is selected from the group consisting of polycarbonate resin, acrylic resin, epoxy resin, urethane resin, perfluoroether resin, and nylon resin.

8. The resin blend of claim 1 wherein the resin is a thermosetting resin.

9. The resin blend of claim 1 wherein the resin is an epoxy resin and the resin blend has a coefficient of thermal expansion less than 50 parts-per-million and the resin has a first light transmission, the resin blend has a second light transmission and a difference between the first light transmission and the second light transmission is not greater than 5% of the first light transmission.

10. The resin blend of claim 1 wherein the plurality of nano-particles compose between 10 vol. % and 34 vol. % of the resin blend.

11. The resin blend of claim 1 wherein the plurality of nano-particles has a mean particle size between 2 nanometers and 3 microns.

12. The resin blend of claim 1 wherein the plurality of micro-particles comprises material having a coefficient of thermal expansion less than 20 parts-per-million.

13. The resin blend of claim 1 wherein the plurality of nano-particles comprises material selected from the group consisting of $SiO_2$, $TiO_2$, $ZrO_2$, $BaSO_4$, $Al_2O_3$, mixed metal oxides, metal sulfides, mixed metal oxides and sulfides, inorganic salts of organic acids, semiconductor or metallic elements associated with organic ligands, and polymers.

14. The resin blend of claim 1 wherein the plurality of micro-particles compose at least 30 vol. % of the resin blend.

15. The resin blend of claim 1 wherein the matrix has a first coefficient of thermal expansion and the resin blend has a second coefficient of thermal expansion, the second coefficient of thermal expansion being not greater than 70% of the first coefficient of thermal expansion.

16. A method of making a resin blend, the method comprising:

mixing nano-particles having a first index of refraction with resin having a second index of refraction to form a matrix having an intermediate index of refraction; and mixing micro-particles with the nano-particles and the resin to adjust a coefficient of thermal expansion of the resin blend.

17. The method of claim 16 wherein the resin is a two-part resin and the nano-particles are mixed with a first part of the two-part resin.

18. The method of claim 17 wherein the micro-particles are mixed with the first part of the two-part resin before the first part of the two-part resin is mixed with a second part of the two-part resin.

19. The method of claim 17 wherein the micro-particles are mixed with a second part of the two-part resin before the first part of the two-part resin is mixed with the second part of the two-part resin.

20. The method of claim 16 further comprising a step, before the step of mixing micro-particles, of treating the micro-particles to promote adhesion of the micro-particles with the resin.

21. A resin blend made according to the method of claim 16.

* * * * *